(12) United States Patent
Matsuzaka et al.

(10) Patent No.: US 12,497,959 B2
(45) Date of Patent: Dec. 16, 2025

(54) GAS COMPRESSOR

(71) Applicant: Hitachi Industrial Equipment Systems Co., Ltd., Tokyo (JP)

(72) Inventors: Takehiro Matsuzaka, Tokyo (JP); Toshiaki Yabe, Tokyo (JP)

(73) Assignee: HITACHI INDUSTRIAL EQUIPMENT SYSTEMS CO., LTD., Tokyo (JP)

( * ) Notice: Subject to any disclaimer, the term of this patent is extended or adjusted under 35 U.S.C. 154(b) by 0 days.

(21) Appl. No.: 18/567,792

(22) PCT Filed: Sep. 14, 2022

(86) PCT No.: PCT/JP2022/034367
§ 371 (c)(1),
(2) Date: Dec. 7, 2023

(87) PCT Pub. No.: WO2023/048041
PCT Pub. Date: Mar. 30, 2023

(65) Prior Publication Data
US 2024/0369053 A1 Nov. 7, 2024

(30) Foreign Application Priority Data
Sep. 21, 2021 (JP) .................................. 2021-153290

(51) Int. Cl.
*F04B 39/16* (2006.01)
*F04B 39/06* (2006.01)
(Continued)

(52) U.S. Cl.
CPC .............. *F04B 39/16* (2013.01); *F04B 39/06* (2013.01); *F04B 39/066* (2013.01);
(Continued)

(58) Field of Classification Search
CPC .......... F04C 18/16; F04C 29/04; F04C 28/06; F04C 2270/80; F04C 23/00;
(Continued)

(56) References Cited

U.S. PATENT DOCUMENTS 6,102,665 A * 8/2000 Centers ................... F04B 49/10
417/18
8,167,584 B2 * 5/2012 Pyke .................... F04D 29/5806
417/366

(Continued)

FOREIGN PATENT DOCUMENTS

CN 102725529 A 10/2012
JP 2-95407 A 4/1990
(Continued)

OTHER PUBLICATIONS

Japanese Office Action received in corresponding Japanese Application No. 2023-549503 dated May 7, 2025.
(Continued)

*Primary Examiner* — Peter J Bertheaud
(74) *Attorney, Agent, or Firm* — MATTINGLY & MALUR, PC

(57) ABSTRACT

The gas compressor comprising a pre-filter for compressed air is placed at the compressed air intake of the enclosure for primary removal of dust, and an intake filter for further secondary removal of dust, at least one compressor body that draws in and compresses air a motor that drives the compressor body, air cooler cools compressed air, a cooling fan that passes cooling air to the air cooler, a cooling air intake that draws in more than the outside air by means of a cooling fan, a pre-filter for cooling air installed in the cooling air intake, and a controller for controlling an operation of the gas compressor, wherein the controller determines the frequency of cleaning or replacement of the pre-filter for
(Continued)

compressed air and the pre-filter for cooling air based on the load factor, which is an indicator of the operating condition.

1 Claim, 13 Drawing Sheets

(51) Int. Cl.
| | |
|---|---|
| *F04B 41/00* | (2006.01) |
| *F04B 49/06* | (2006.01) |
| *F04B 49/20* | (2006.01) |
| *F04B 53/08* | (2006.01) |
| *F04C 18/16* | (2006.01) |
| *F04C 23/00* | (2006.01) |
| *F04C 28/06* | (2006.01) |
| *F04C 29/04* | (2006.01) |

(52) U.S. Cl.
CPC ............ *F04B 49/065* (2013.01); *F04B 49/20* (2013.01); *F04B 53/08* (2013.01); *F04C 18/16* (2013.01); *F04C 23/00* (2013.01); *F04C 28/06* (2013.01); *F04C 29/04* (2013.01); *F04B 41/00* (2013.01); *F04C 2240/81* (2013.01); *F04C 2270/80* (2013.01)

(58) Field of Classification Search
CPC ...... F04C 2240/81; F04B 39/06; F04B 35/04; F04B 39/066; F04B 49/20; F04B 49/065; F04B 53/08; F04B 39/16
See application file for complete search history.

(56) References Cited

U.S. PATENT DOCUMENTS

| | | |
|---|---|---|
| 2008/0014097 A1 | 1/2008 | Hase et al. |
| 2015/0330861 A1 | 11/2015 | Alsaleem |
| 2021/0076846 A1 | 3/2021 | Saneyoshi |

FOREIGN PATENT DOCUMENTS

| | | |
|---|---|---|
| JP | 2003-269772 A | 9/2003 |
| JP | 2006-288513 A | 10/2006 |
| JP | 2008-19746 A | 1/2008 |
| JP | 2018-44546 A | 3/2018 |
| WO | 2011/093135 A1 | 8/2011 |
| WO | 2015/175814 A1 | 11/2015 |
| WO | 2019/082552 A1 | 5/2019 |
| WO | 2019/189754 A1 | 10/2019 |

OTHER PUBLICATIONS

International Search Report of PCT/JP2022/034367 dated Oct. 25, 2022.
Chinese Office Action received in corresponding Chinese Application No. 202280043536.4 dated Sep. 24, 2025.

* cited by examiner

GAS COMPRESSOR

BACKGROUND OF THE INVENTION

1. Field of the Invention

This invention relates to a gas compressor.

2. Description of the Related Art

In gas compressors, for example, compressors that suck and compress air, which is a gas, are equipped with one or more intake filters to filter the air that flows into the compressor body, which has a reciprocating or rotating body inside. The compressor body is also equipped with a filter inside a housing to provide soundproofing and weather resistance. In addition, an outdoor air filter may be installed in the air intake provided in the enclosure to remove dust and other particles from the outdoor air to some extent. Thus, there is known technology to ensure that clean air is sucked into the main body of the compressor by means of a multi-stage filter. As a conventional technology of this type, there is, for example, Japanese Patent Publication, JP2018-44546A.

JP2018-44546A discloses a system for predicting the degradation rate of components of a condition-based monitoring turbomachinery. In this system, a compressor is disclosed that uses a compressor degradation prediction model that provides a function of compressor performance to predict the compressor degradation rate based on sensor data, one or more filter degradation rates, or some combination thereof. A point is disclosed where one or more preventive actions are performed based on the degradation prediction from this predictive model.

Japanese Patent Publication JP2018-44546A

In JP2018-44546A, regarding the filter degradation prediction model that calculates the filter degradation rate, it can be predicted that the amount of intake air passing through the filter and the load operating time of the compressor also have a significant impact on the prediction model. However, there is no specific teach to the relationship between the load factor, which is an indicator of the compressor's operating condition determined by parameters such as the drive system of the compressor related to the air volume, the ratio of the opening time of the suction valve in the compressor to the operating time, or the rotation speed of the motor or prime mover that drives the main body of the compressor.

In addition, in the case of a configuration in which a pre-filter is placed further upstream of the filter house for primary removal of dust in the air, JP2018-44546A does not specifically describe a method for determining when the pre-filter should be cleaned or replaced.

Furthermore, the filter in JP2018-44546A filters the air that the turbo compressor body inhales, but in the case of a compressor with an air-cooled cooler for cooling compressed air, a cooling fan may be provided and a pre-filter for the cooler for primary removal of dust may be provided at the intake of the cooling fan. There is no mention of a study equivalent to a filter degradation prediction model for the pre-filter for coolers.

SUMMARY OF THE INVENTION

The purpose of the present invention is to optimize the frequency of cleaning or replacement of compressed air pre-filters and cooling air pre-filters in view of the above issues.

The invention comprises, in one example, a gas compressor comprising a pre-filter for compressed air being placed at the compressed air intake of the enclosure for primary removal of dust, and an intake filter for further secondary removal of dust, at least one compressor body that draws in and compresses air through an intake filter and intake passage, a motor that drives the compressor body, air coolers cool compressed air, a cooling fan that passes cooling air to the air cooler, a cooling air intake that draws in more than the outside air by means of a cooling fan, a pre-filter for cooling air installed in the cooling air intake, and a controller for controlling an operation of the gas compressor, wherein the controller determines the frequency of cleaning or replacement of the pre-filter for compressed air and the pre-filter for cooling air based on the load factor, which is an indicator of the operating condition.

The present invention has the effect of optimizing the frequency of cleaning or replacement of compressed air pre-filters and cooling air pre-filters.

DETAILED DESCRIPTION OF THE PREFERRED EMBODIMENTS

Examples of the invention are described below using the figures.

In this example, an air-cooled, oilless two-stage screw air compressor is used as an example of a gas compressor.

Example 1

Figure 1:
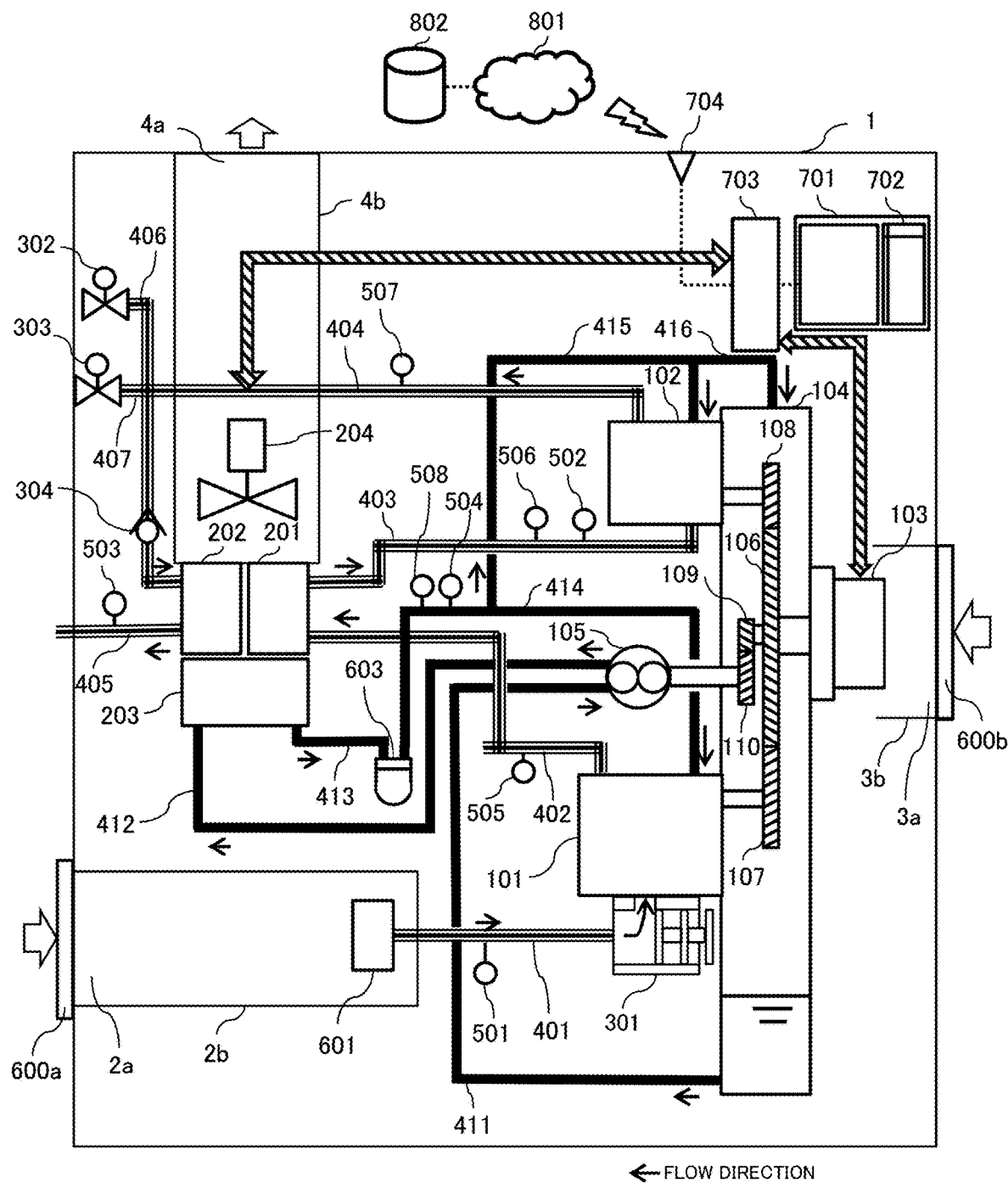
FIG. 1 is a system diagram showing the components of the gas compressor in Example 1.

FIG. 1 shows a system diagram of the components of the gas compressor in this example, The low-pressure stage compressor body 101 and the high-pressure stage compressor body 102 are driven to intake, compress, and discharge air.

In FIG. 1, the low-pressure stage compressor body 101, high-pressure stage compressor body 102, motor 103, and oil pump 105 are fixed to the speed increaser case 104. The pressure stage compressor body 101 and the high-pressure stage compressor body 102 are attached to the drive shaft of the motor 103, bull gear 106 and oil pump pinion 109 are fitted to the drive shaft of motor 103 from the root side of the drive shaft. The bull gear 106 is mutually engaged with the low-pressure stage pinion 107 and the high-pressure stage pinion 108, and the oil pump pinion 109 is engaged with the oil pump gear 110. Motor 103 drives the low-pressure stage compressor body 101, high-pressure stage compressor body 102, and oil pump 105 by rotating the bull gear 106.

In addition, processing at the start of operation, the motor 103 drives the low-pressure stage compressor body 101 and the high-pressure stage compressor body 102, and the inlet valve 301 is opened. Air is drawn in from the atmosphere through the pre-filter for compressed air 600a installed in the air intake 2a of the gas compressor 1 housing, dust is first separated from the sucked air, the air passes through the intake duct 2b, and dust is further separated in the intake filter 601. The air then passes through intake duct 2b, where dust is secondarily separated by intake filter 601, and highly clean air flows into low-pressure stage compressor body 101 through intake air path 401 and intake valve 301, which are intake air paths.

The low-pressure stage compressor body 101 compresses air to a predetermined pressure, and the compressed air flows through the low-pressure stage discharge air path 402 to the intercooler 201. Intercooler 201 is an air-cooled heat exchanger, or air cooler, after cooling in the intercooler 201, the compressed air flows through the high-pressure stage inlet air path 403 to the high-pressure stage compressor body 102, where the air is compressed to a higher pressure. The high pressure compressed air discharged from the high-pressure stage compressor body 102 flows through the high-pressure stage discharge air path 404 to the aftercooler 202. The compressed air cooled by aftercooler 202 is supplied to the compressed air demand destination through discharge air path 405.

The pre-filter for compressed air 600a is generally relatively less precise in filtration than the intake filter 601 and is intended for primary removal of relatively large foreign matter and dust. Pre-filter for compressed air 600a is expected to delay clogging of intake filter 601. Similarly, pre-filter for cooling air 600b can be attached to the cooling air intake 3a to similarly remove relatively large foreign matter and dust. Therefore, the air sucked in by the cooling fan 204 through the cooling air intake 3a and cooling air duct 3b is clean to some extent, and the air is not clogged with dust on the cooling fins of the intercooler 201, aftercooler 202, and oil cooler 203, which are air-cooled. The clogging of dust on the cooling fins of the air-cooled intercooler 201, aftercooler 202, and oil cooler 203 can be reduced. The cooling air that has passed through the above-mentioned intercooler 201, aftercooler 202, and oil cooler 203 and exchanged heat with hot compressed air and lubricating oil passes through fan duct 4b and is discharged to the atmosphere through exhaust port 4a.

The low-pressure stage compressor body 101, high-pressure stage compressor body 102, speed increaser case 104, and oil pump 105 have built-in bearings that support the internal rotating parts not shown. Since the bull gear 106, low-pressure stage pinion 107, high-pressure stage pinion 108, oil pump pinion 109, and oil pump gear 110 rotate while meshing with each other, these mechanical parts generally require lubricant. In this example, lubricant is stored in the lower part of the speed increaser case 104.

When the oil pump 105 is driven by the motor 103, lubricating oil is sucked in from the bottom of the speed increaser case 104, passes through the suction oil piping 411, and flows into the oil pump 105. The lubricating oil discharged from the oil pump 105 passes through the discharge oil path 412, is cooled by the oil cooler 203, which is an air-cooled heat exchanger, and is then delivered to the main lubrication path 413. An oil filter 603 is installed in the middle of the main lubrication route 413. The main lubrication route 413 branches into a low-pressure stage lubrication route 414, a high-pressure stage lubrication route 415, and a speed increaser lubrication route 416 to supply lubricating oil to the low-pressure stage compressor body 101, high-pressure stage compressor body 102, and speed increaser case 104.

There is an air release device on the compressed air path to release the compressed air remaining in the compressed air path to the outside when the gas compressor is in no-load operation or when operation is stopped. The air release valve 302 and the air release valve 303 release compressed air outside on the air path from the discharge side of the high-pressure stage compressor body 102 to the check valve 304.

Various detectors are installed at various locations inside the gas compressor 1 to allow a controller 703 to determine whether the gas compressor is in good operating condition and to control the operation of the gas compressor. For example, there is a suction pressure sensor 501 on the suction air path 401, a low pressure stage discharge air temperature sensor 505 on the low pressure stage discharge air path 402, a high pressure stage suction air pressure sensor 502 and a high pressure stage suction air temperature sensor 506 on the high pressure stage suction air path 403, a high pressure stage discharge air temperature sensor 507, and a discharge air pressure sensor 503 on the discharge air path 405. In addition, an oil pressure sensor 504 and an oil temperature sensor 508 are provided on the low-pressure stage oil supply route 414.

The operation of gas compressor 1 is input to display and input device 701, and the controller 703 controls output of all electrical and electronic devices of gas compressor 1 based on the input values. The controller 703 also receives inputs from various detectors inside the gas compressor, and monitors, determines, and controls the operating status of the gas compressor based on a program set in a memory unit 702 in advance.

An antenna 704 is a wireless transmitter/receiver for transmitting and receiving values detected by various detection devices built into gas compressor 1 and information stored in memory unit 702 to an external server 802 via communication network 801.

Remote viewers, not shown in the figure, can view the gas compressor information stored on an external server 802 via various information terminals.

Figure 2:
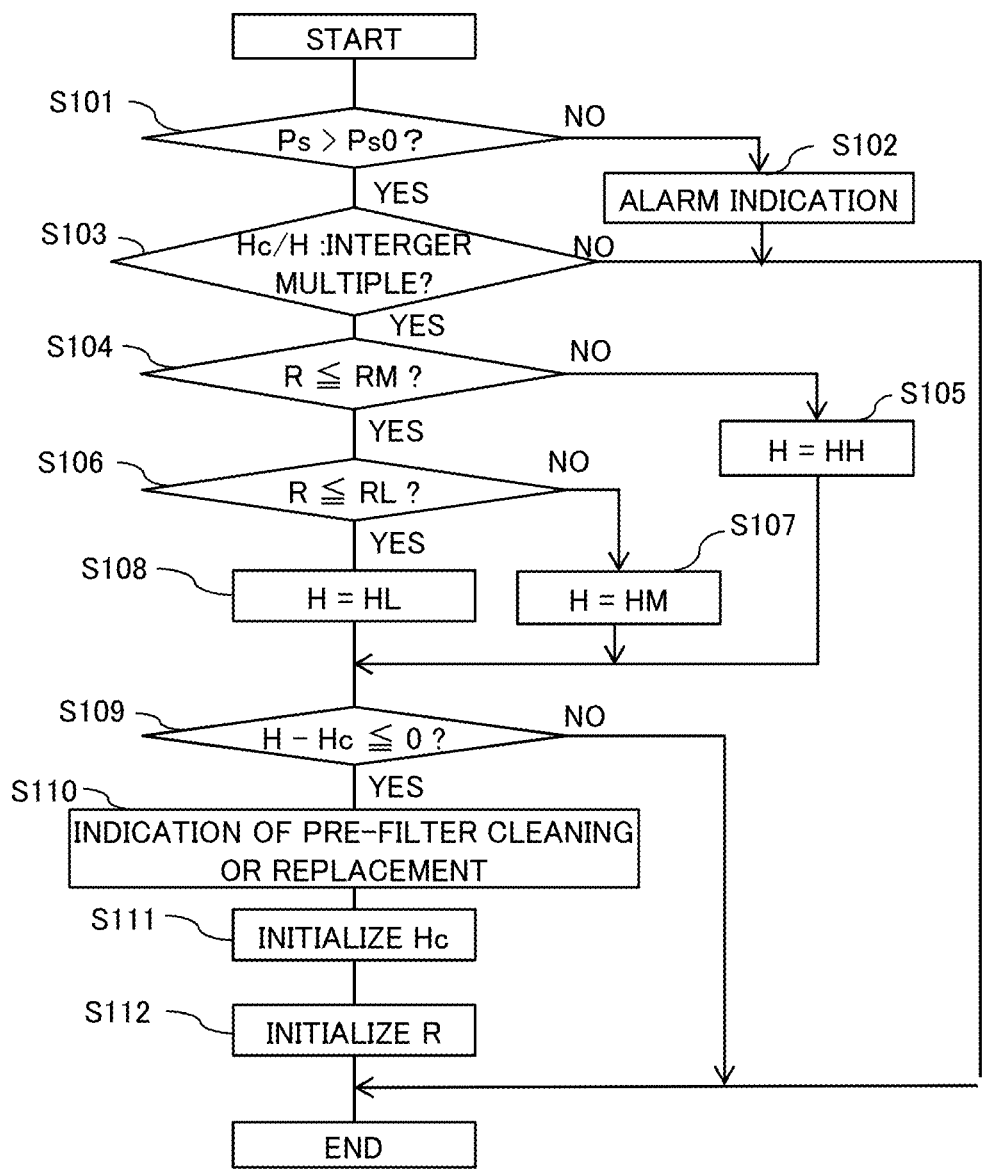
FIG. 2 shows a process flow for determining when to clean or replace the pre-filters for compressed air and cooling air in Example 1.

FIG. 2 is a process flowchart for determining when to clean or replace the pre-filters for compressed air and cooling air, performed by a controller 702 of gas compressor 1 in FIG. 1 in this example. The low-pressure stage compressor body 101 and high-pressure stage compressor body 102 in this example are fixed-speed machines in which the motor 103 is driven at a fixed speed based on the power supply frequency. The cooling fan 204 is also a fixed speed control that operates at a fixed rotational speed based on the power supply frequency.

When the operator of gas compressor 1 operates the display and input device 701 to start operation, motor 103 starts and low-pressure stage compressor body 101 and high-pressure stage when the motor 103 starts. The suction valve 301 opens and the air drawn in from the atmosphere passes through the pre-filter for compressed air 600a and the intake filter 601 to remove most of the dust. The air then flows into the low-pressure stage compressor body 101, where it is compressed in the first stage. Thereafter, the compressed air flows along the flow direction shown in the system diagram in FIG. 1, and finally the compressed air at a predetermined pressure is supplied to the compressed air demand destination from the discharge air path 405.

At the same time when motor 103 is started, cooling fan 204 is also started, and outside air passes through pre-filter for cooling air 600b as cooling air to roughly remove dust. The cooling air then passes through intercooler 201, aftercooler 202, and oil cooler 203 to exchange heat with high-temperature fluid before being exhausted from exhaust port 4a.

In step S101 of FIG. 2, when motor 103 starts and suction valve 301 opens to start suctioning air, determine whether the suction pressure Ps, detected by suction pressure sensor 501 (a negative value because of gauge pressure), is Ps>Ps0. Ps0 is the preset suction pressure warning value. In this case, proceed to step S103. If Ps≤Ps0, it means that the intake filter is clogged. In this case, the pressure ratio inside the compressor body becomes large, which may cause the discharge air temperature to become abnormally high, possibly resulting in a failure. Therefore, to prevent this, the flowchart proceeds to step S102 and promptly displays an alarm (alarm indication) to an external server 802 via display and input device 701 or communication network 801, or to an information terminal not shown in the figure that is being remotely monitored via the server 802. Then, this flowchart ends.

In step S103, if the accumulated operating time Hc from the last cleaning instruction to the present is an integral multiple of the predetermined judgment cycle H, go to step S104; if it is not an integral multiple, this flowchart ends.

Next, in step S104 or later, the frequency of pre-filter cleaning or replacement is determined. It is preferable to clean or replace both h pre-filters at the same time, without distinguishing between pre-filters for cooling air or compressed air, to maintain the performance and reliability of the gas compressor. However, the pre-filter is not always cleaned or replaced at the same time. Therefore, the average load factor R of the gas compressor and the average load factor Rf of the cooling fan may be compared, and the value with the larger load factor may be used to determine how often the pre-filter should be cleaned or replaced. Alternatively, in the case of fixed speed control, where the cooling fan 204 is always operated at a constant rotation speed regardless of the operating status of the gas compressor 1, the frequency of cleaning or replacement of the pre-filter may be determined only by the average load factor R of the gas compressor. Therefore, in the subsequent processing, the average load factor R of the gas compressor will be used. When using the cooling fan average load factor Rf, R is read as Rf and the processing is performed.

In step S104, go to step S106 if the average load factor R of gas compressor satisfies R≤RM relative to the medium load factor determination value RM, and if not, go to step S105.

Here, the average load factor R is defined as follows. That is, if the rotation speed of motor 103 is a fixed speed machine, as an example, the operation cycle time T3 is one cycle of load operation and no-load operation, the present load factor Rc [%]=load operation time T2/operation cycle time T3 is calculated. Here, the operation cycle time T3=no-load operation time T1+load operation time T2. However, T1, T2, and T3 refer to the respective times in the operation cycle one time before the operation cycle in which the gas compressor is currently operating. The current load factor Rc is summed up for N load cycles (=number of operation cycles) from the last load factor judgment to the present and divided by N to obtain the average load factor R. In other words, the average load factor R can be expressed as R=ΣRC/N.

If R>RM is determined in step S104 and the program proceeds to step S105, a predetermined high frequency cleaning cycle HH, e.g., 100 hours, is assigned to the pre-filter determination cycle H, and the program proceeds to step S109.

If R≤RM is determined in step S104 and the system proceeds to step S106, the system proceeds to step S108 if the average load factor R satisfies R≤RL relative to the low load factor determination value RL. If this is not satisfied, proceed to step S107.

In step S107, substitute the normal cleaning cycle HM, e.g., 200 hours, for the judgment cycle H of the prefilter, and proceed to step S109. If R≤RL is determined in step S106 and the program proceeds to step S108, the low-frequency cleaning cycle HL, e.g., 400 hours is substituted for the pre-filter determination cycle H, and the program proceeds to step S109.

In step S109, H-Hc, the difference of the cumulative operating time Hc from the last cleaning instruction to the present, is calculated against the judgment cycle H of the pre-filter assigned in the step before step S109. If H-Hc≤0 is satisfied, that is, the accumulated operating time Hc from the last cleaning instruction to the present exceeds the cycle for pre-filter cleaning (judgment cycle H), the system judges that it is time to clean the pre-filter and proceeds to step S110 to display a message recommending cleaning or replacement of the pre-filter on the display and input device 701. And the controller 703 transmits data recommending cleaning or replacement of the pre-filter to the server 802 via the communication network 801. Thereafter, the flowchart proceeds to step S111 to initialize the accumulated operation time Hc from the last cleaning instruction to the present with 0, also to initialize the average load factor R stored in memory unit 702 for presenting with 0 (step 112). Then terminates this flowchart.

If H-Hc≤0 is not satisfied in step S109, that is, if the accumulated operating time Hc from the last cleaning instruction to the present has not reached the judgment cycle H, then this flowchart ends.

According to the flow chart in FIG. 2, the high and low load factor of the gas compressor are related to the amount of air passing through the suction pre-filter for compressed air 600a. If the average load factor R is higher than the medium load factor determination value RM, the volume of air passing through the pre-filter for compressed air 600a becomes larger, and the amount of dust collected by the pre-filter for compressed air 600a increases proportionally. In this case, the recommended cleaning cycle is selected as the high frequency cleaning cycle HH, which means that the pre-filter should be cleaned or replaced at an earlier cycle than usual.

On the other hand, if the average load factor R is lower than the low load factor determination value RL, the amount of dust collected by the pre-filter for compressed air 600a is also lower. Therefore, the cleaning frequency is at least better, so the low-frequency cleaning cycle HL is selected, and the pre-filter cleaning cycle becomes longer. This reduces the number of pre-filter cleaning cycles for the user.

As described above, this example makes it possible to optimize the frequency of cleaning or replacement of the pre-filter for compressed air and the pre-filter for cooling air according to the type of gas compressor and load factor.

Example 2

This example describes an example in which changes in the input current of the cooling fan are considered to provide instructions for cleaning or replacing the pre-filter.

The system diagram showing the components of the gas compressor in this example is a configuration with an ammeter that measures the input current of the cooling fan 204, for the configuration in FIG. 1, and its system diagram is omitted.

Figure 3:
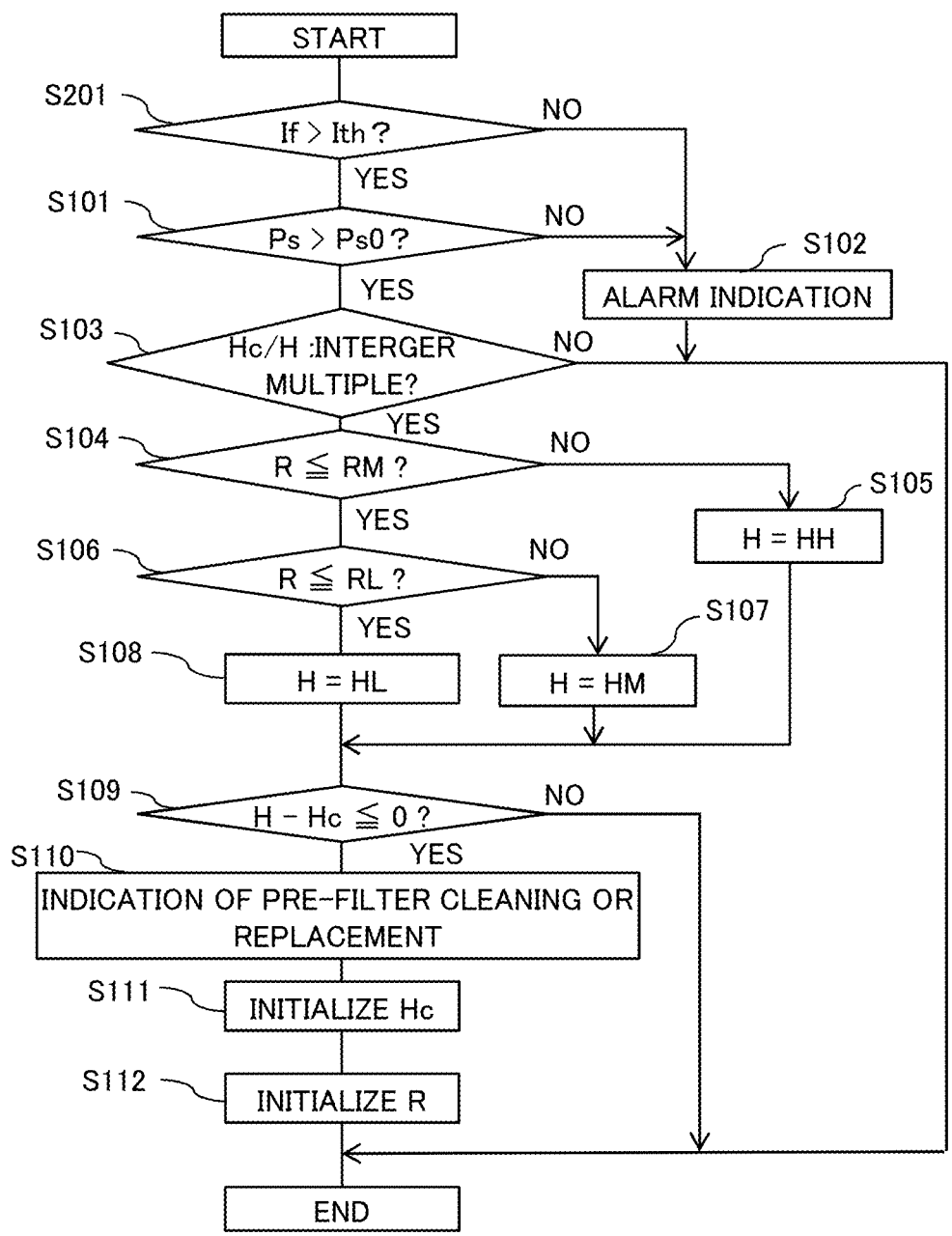
FIG. 3 shows a process flowchart for determining when to clean or replace the prefilter in Example 2.

FIG. 3 is a processing flowchart for determining when to clean or replace the prefilter in this example. This processing flowchart is executed by controller 702. In FIG. 3, the same processing steps as those in FIG. 2 are marked with the same symbols and their explanations are omitted.

In the case of fixed speed control, where cooling fan 204 is always operated at a constant speed depending on the power supply frequency, the amount of air sucked in through cooling air intake 3a decreases as the clogging of pre-filter for cooling air 600b progresses. When the amount of air drawn in decreases, the power consumption of the cooling fan decreases compared to when there is little clogging of the pre-filter for cooling air 600b, and therefore the input current value also decreases. Therefore, in step S201, a predetermined threshold value "Ith" is set for the input current "If" of cooling fan 204, and if the cooling fan input current "If" is smaller than the predetermined threshold value "Ith", it is judged that clogging of pre-filter for cooling air 600b has progressed to a considerable degree. Then, instructions for cleaning or replacing the pre-filter for cooling air 600b, or both pre-filter for cooling air 600b and pre-filter for compressed air 600a, should be displayed on the display and input device 701 to prompt the user to pay attention and take action.

As described above, in addition to the effect of Example 1, this example has the effect of being able to determine the clogging of pre-filter for cooling air 600b in advance.

Example 3

This example describes a case in which the cooling fan is driven by an inverter and its speed is controlled at variable speed.

Figure 4:
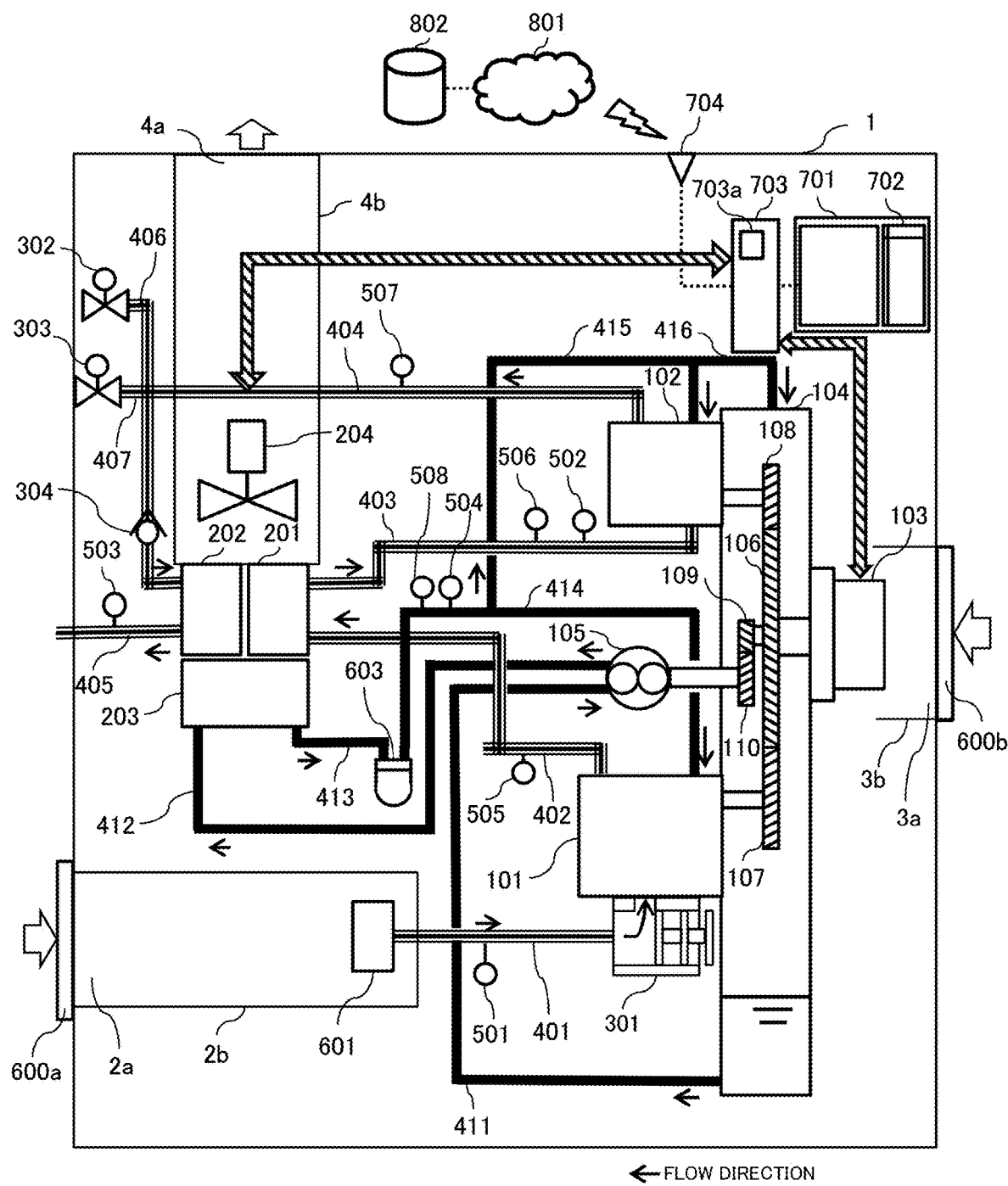
FIG. 4 is a system diagram showing the components of the gas compressor in Example 3.

FIG. 4 is a system diagram showing the components of the gas compressor in this example. The difference from FIG. 1 is that the controller 703 is equipped with an inverter for cooling fan 703a, which is a variable speed control device for cooling fan.

The processing flowchart for determining when to clean or replace the pre-filters for compressed air and cooling air by gas compressor 1 in FIG. 4 in this example. This processing flowchart is similar to that in FIG. 2 but differs in that it is driven by an inverter and the speed is controlled at variable speed. In the case of a cooling fan driven by an inverter with variable speed control of the rotation speed, the method of calculating the average load factor differs from the fixed speed case. An example of how to calculate the average load factor of variable speed is shown below. For cooling fans driven by an inverter, the current load factor of the cooling fan Rfc=(load time T2·fan inverter current frequency ffc [Hz])/(operation cycle time T3·fan inverter rated frequency ffr [Hz]). This is obtained as the cooling fan average load factor Rf [%]=ΣRfc/N, averaged over N load cycles from the last load factor determination to the last operation cycle.

As described above, this example, as in Example 1, makes it possible to optimize the frequency of cleaning or replacement of the pre-filter for compressed air and the pre-filter for cooling air according to the type of gas compressor and load factor.

Example 4

Example 2 describes an example in which instructions for cleaning or replacing the pre-filter are given by considering changes in the cooling fan input current. However, in Example 2, cooling fan 204 is controlled at a fixed speed, whereas if the cooling fan is controlled at a variable speed, for example, the rotating speed of cooling fan 204 is controlled to be lower during no-load operation than during load operation, the input current of cooling fan 204 will also decrease due to the lower rotating speed. The input current of cooling fan 204 also decreases. Therefore, it is not always accurate to judge the clogging state of the pre-filter simply by the threshold value of the input current.

Therefore, this example describes an example in which clogging of the pre-filter for cooling air 600b can be determined in advance when the cooling fan is driven by an inverter and its speed is controlled at variable speed.

The system diagram showing the components of the gas compressor in this example is the configuration with an ammeter to measure the input current of the inverter for cooling fan 703a, as opposed to the configuration in FIG. 4. The other components are the same, so their description is omitted.

Figure 5:
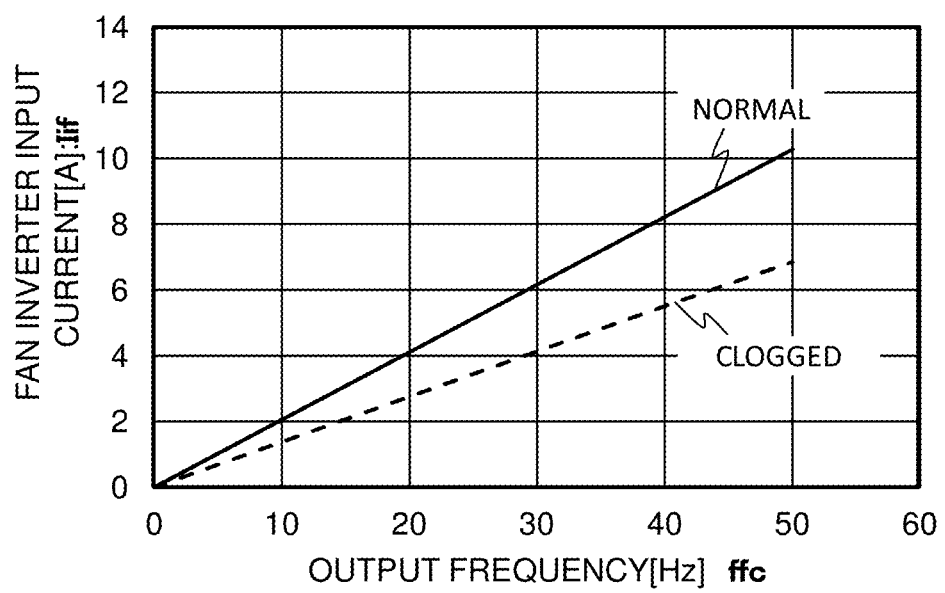
FIG. 5 shows the relationship between the output frequency of the inverter for cooling fans and the inverter input current in Example 4.

FIG. 5 shows the relationship between the output frequency of the inverter for cooling fan and the inverter input current value in this example. In FIG. 5, the relationship between the output frequency "ffc" of the inverter for cooling fan and the input current "Iif" of the inverter for cooling fan shows that when the prefilter is clogged, the input current "Iif" is lower for the same output frequency "ffc" than in normal operation.

Figure 6:
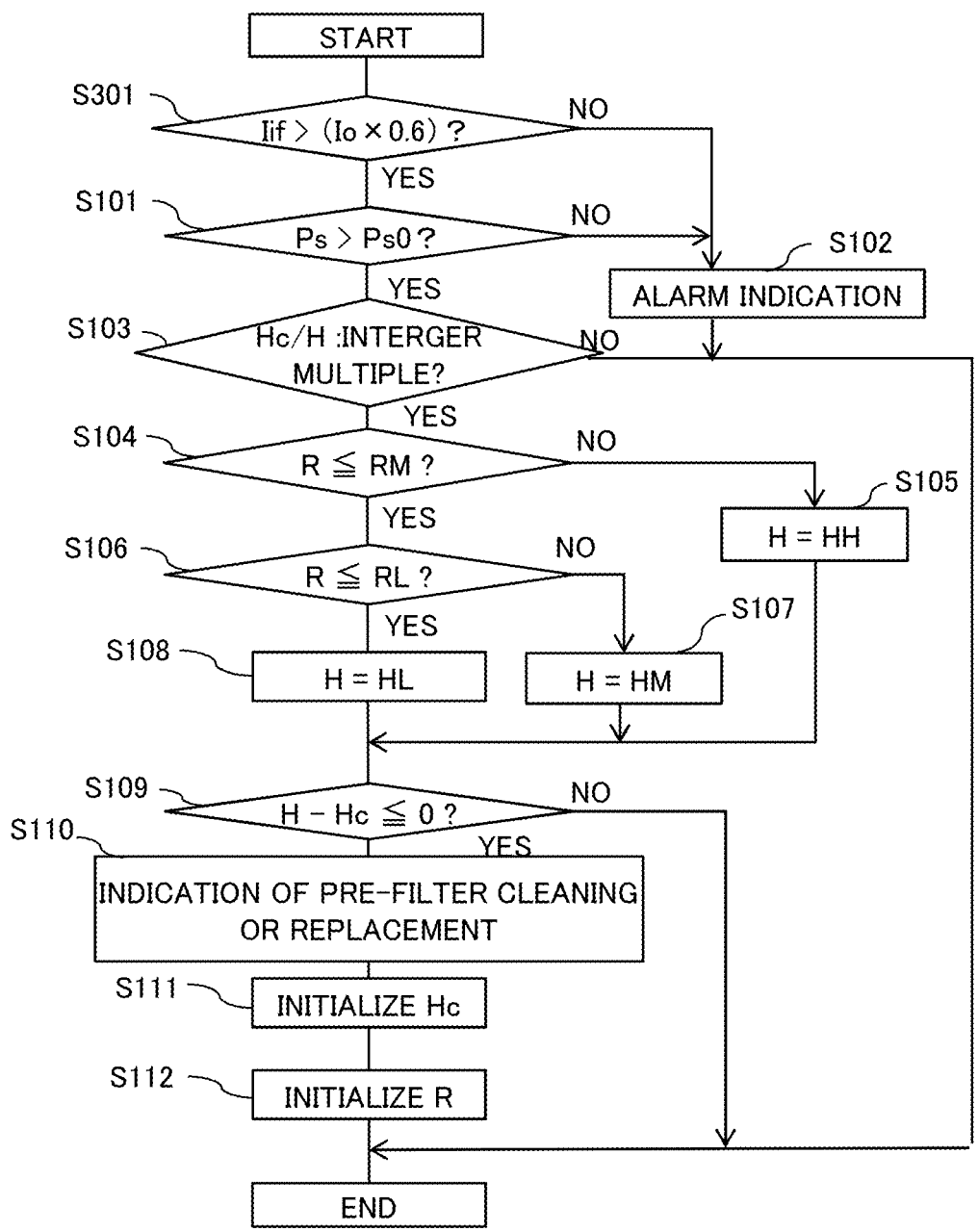
FIG. 6 shows a process flowchart for determining when to clean or replace the prefilter in Example 4.

FIG. 6 is a flowchart for determining when to clean or replace the pre-filter in this example. This processing flowchart is executed by controller 702. The difference from FIG. 3 in FIG. 6 is that step S201 is replaced with step S301.

In step S301 of FIG. 6, the characteristics of the assumed output frequency "ffc" of the inverter for cooling fan and the input current "Iif" of the inverter for cooling fan are grasped in advance, as shown in FIG. 5, and if the measured cooling fan inverter input current "Iif" is only 60% or less than the predicted inverter input current "Io" at the specified output frequency, the pre-filter for cooling air 600b is judged to be clogged. Instructions for cleaning or replacement should then be displayed on the display and input device 701 to prompt the user to pay attention and take action. The value of 60%, etc., should be a user-adjustable parameter according to the actual installation environment of gas compressor 1 since it is related to the frequency of clogging of the pre-filter.

As described above, in addition to the effect of Example 3, this example has the effect of being able to determine the clogging of pre-filter for cooling air 600b in advance.

Example 5

This example describes a case in which the gas compressor is a variable speed machine in which the motor speed can be controlled by an inverter for the motor, which is a frequency converter, and in which the cooling fan is driven by an inverter and its speed is controlled at variable speed.

Figure 7:
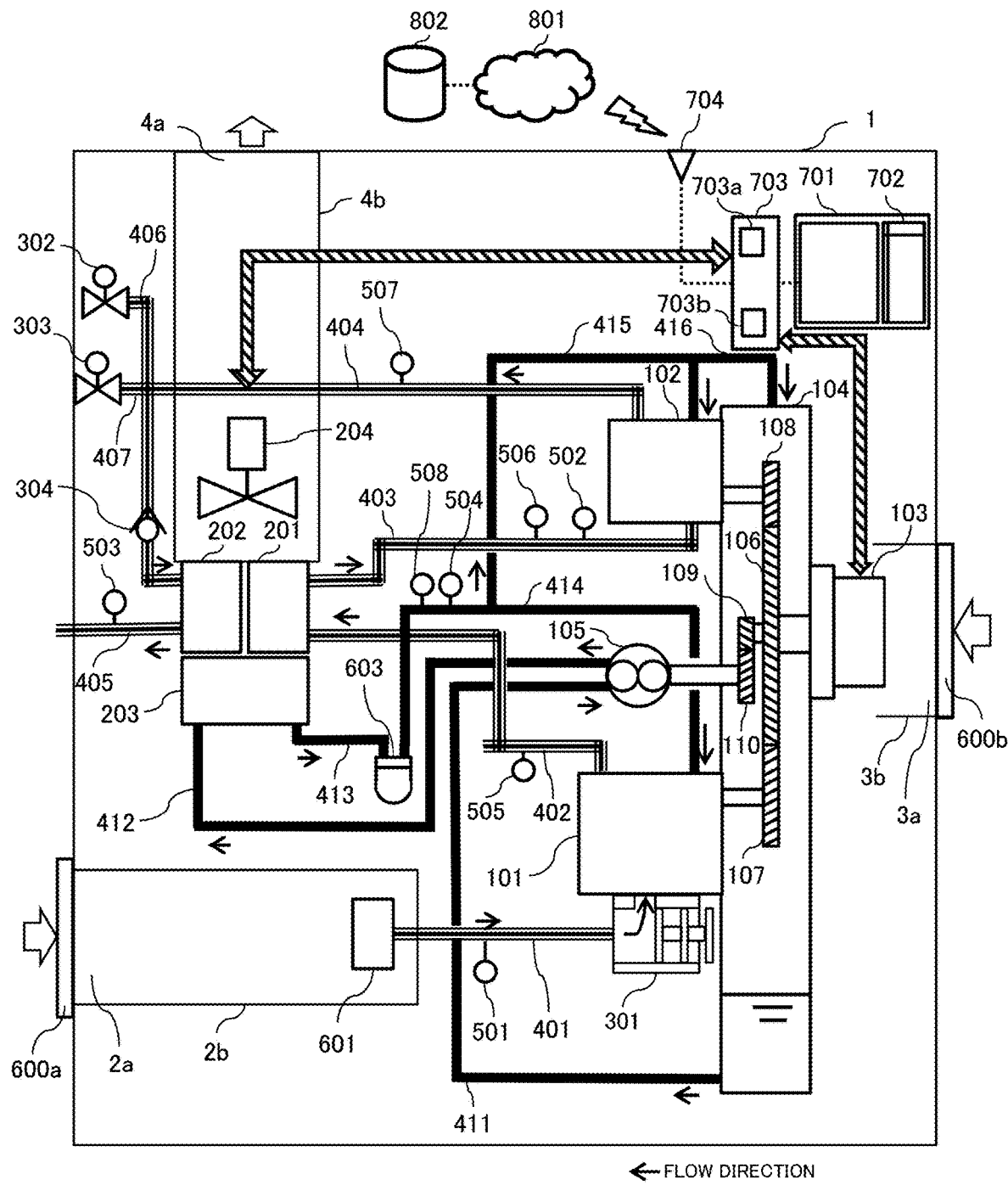
FIG. 7 is a system diagram showing the components of the gas compressor in Example 5.

FIG. 7 is a system diagram showing the components of the gas compressor in this example. The difference from FIG. 4 is that controller 703 is equipped with an inverter for motor 703b, which is a variable speed control device inside controller 703.

The processing flowchart for determining when to clean or replace the pre-filters for compressed air and cooling air by gas compressor 1 in FIG. 7 in this example is the same as in FIG. 2, but the variable speed machine in which the motor rotation speed can be controlled by the inverter for motor 703b. However, the method of calculating the average load factor is different in the case of a variable speed machine that can control the motor speed with the inverter for motor 703b than in a constant speed machine. An example of how to calculate the average load factor of a variable speed machine is shown below. The rotational speed of motor 103 is varied with the output frequency of the inverter so that the discharged air pressure is constant during load operation. The current load factor Rc can be expressed as Rc [%]=(load time T2·current frequency fc [Hz])/(operation cycle time T3·rated frequency fr [Hz]). Therefore, it is obtained as the average load factor R [%]=ΣRC/(load frequency N [times]) of the variable speed machine during the pre-filter cleaning judgment cycle.

As described above, this example, as in Examples 1 and 3, makes it possible to optimize the frequency of cleaning or replacement of the pre-filter for compressed air and the pre-filter for cooling air according to the type of gas compressor and load factor.

Example 6

In Example 5, air intake 2a for compressed air and cooling air intake 3a are independently separated. In this example, the point will be explained that instead of air intake 2a for compressed air, cooling air intake 3a may be configured to serve that function as well.

Figure 8:
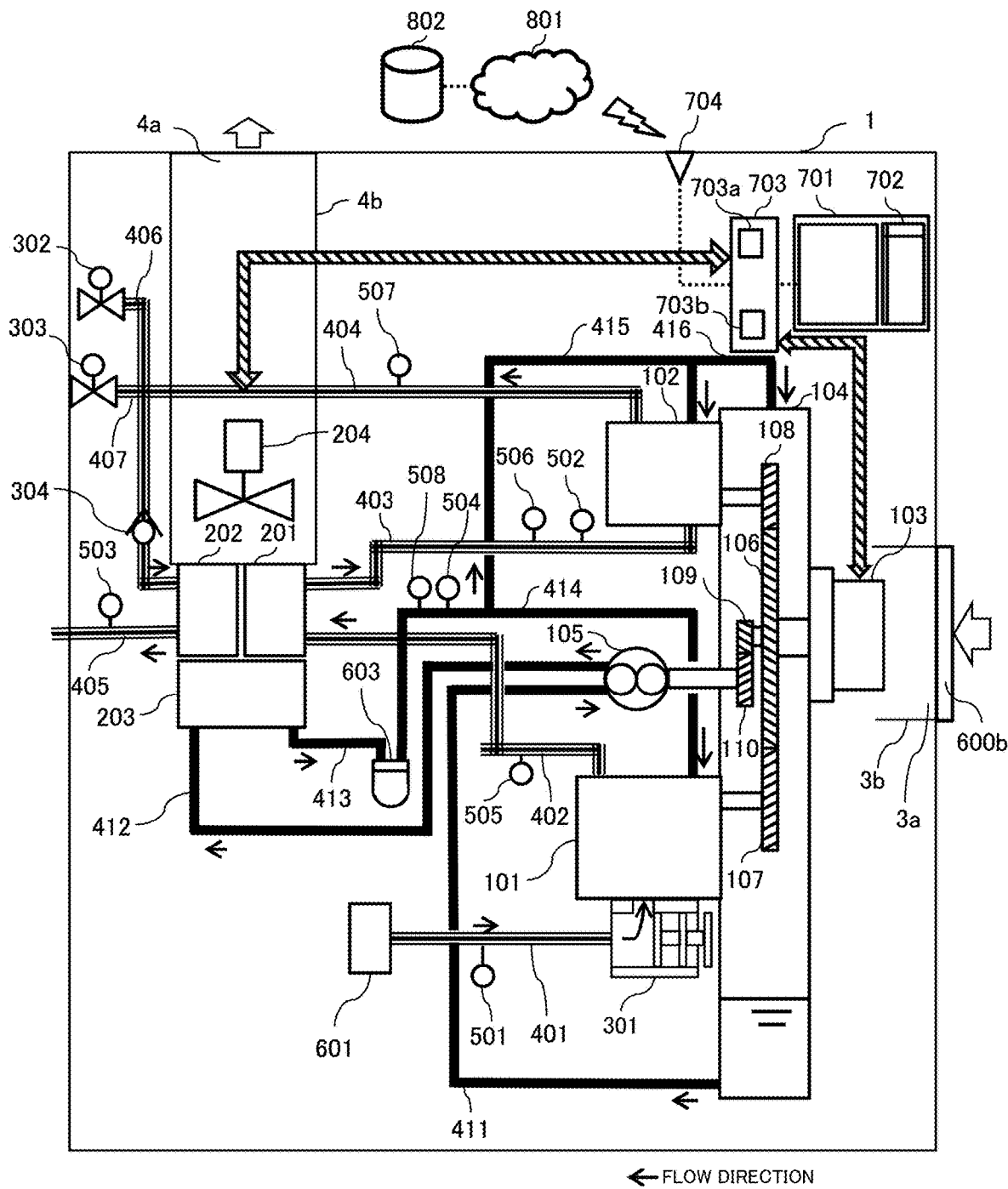
FIG. 8 is a system diagram showing the components of the gas compressor in Example 6.

FIG. 8 is a system diagram showing the components of the gas compressor in this example. FIG. 8 differs from FIG. 7 in that there is no air intake 2a for compressed air, and cooling air intake 3a also functions as air intake 2a for compressed air. There is also no pre-filter for compressed air 600a, and the pre-filter for cooling air 600b also functions as the pre-filter for compressed air 600a.

Thus, in this example, even in the configuration where the cooling air intake 3a also serves as the air intake 2a for compressed air, it is possible to optimize the frequency of cleaning or replacement of the pre-filter that serves both for compressed air and cooling air according to the type of gas compressor and load factor, as in Example 5. The pre-filter can be optimized according to the type of gas compressor and the load factor.

The configuration in which cooling air intake 3a also serves as air intake 2a for compressed air can also be applied to the respective combinations of whether the gas compressor is a fixed-speed or variable-speed machine, or whether the cooling fan is fixed-speed or variable-speed controlled, as shown in Examples 1 through 3. It is also possible to apply the same configuration to a combination of fixed-speed or variable-speed compressors, or fixed-speed or variable-speed cooling fans.

Example 7

In this example, in contrast to Example 1, the suction pressure Ps is the pressure loss (pressure drop) relative to atmospheric pressure, and the absolute value of the suction pressure (negative value with atmospheric pressure as the zero reference) is taken as the pressure loss δp. This example describes a method for estimating the clogging status of the pre-filter and increasing or decreasing the judgment cycle by obtaining the cumulative pressure loss S accumulated and added for the operation time, and by combining the slope ΔS of the cumulative pressure loss curve, which is the change in cumulative pressure loss per given time, and the average load factor R.

Figure 9:
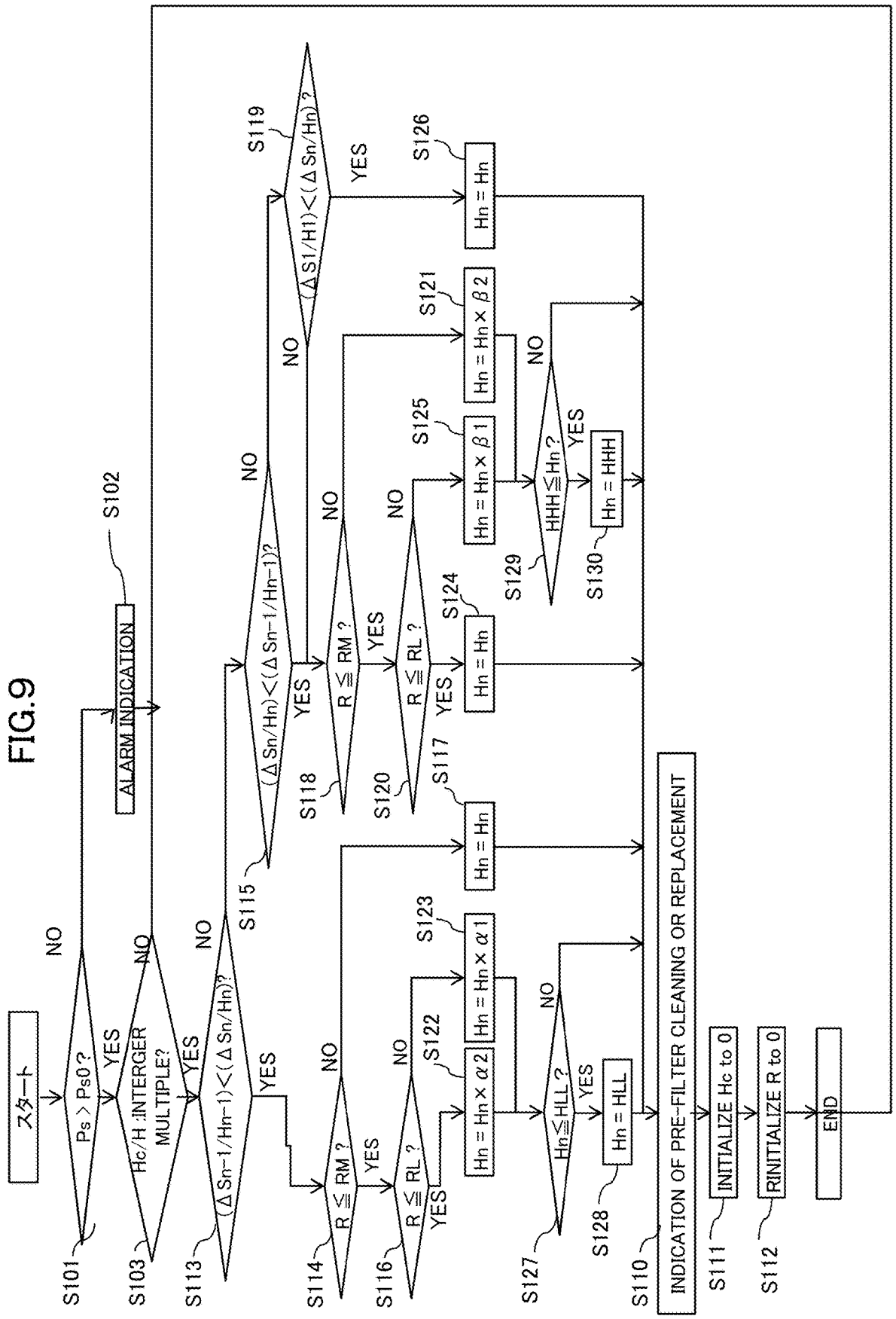
FIG. 9 shows a process flowchart for determining when to clean or replace the prefilter in Example 7.

FIG. 9 is a process flowchart for determining when to clean or replace the pre-filters for compressed air and cooling air by controller 702 of gas compressor 1 in FIG. 1 in this example. In FIG. 9, steps S113, S115, S119, S114, S118, S116, S120, S123, S122, S117, S101, S124, S125, S126, S126, S121 24, step S126, step S125, step S121, and steps S127-130 are substituted for steps S104 through S109, as opposed to FIG. 2.

Step S113 determines whether the relationship (ΔSn−1/Hn−1)<(ΔSn/Hn) is established between the slope ΔSn/Hn of the cumulative pressure loss curve at the current judgment and the slope ΔSn−1/Hn−1 of the cumulative pressure loss curve at the previous judgment.

Step S115 determines whether (ΔSn/Hn)<(ΔSn−1/Hn−1) is true in the case where the above step S113 is not true.

Step S119 determines if (ΔS1/H1)<(ΔSn/Hn) is established between the slope ΔS1/H1 of the cumulative pressure loss between the first and second pre-filter cleaning instructions and the current slope ΔSn/Hn, when the above step S115 is not established.

Steps S114 and 118 determine whether the relationship of average load factor R≤medium load factor determination value RM holds.

Steps S116 and S120 determine whether the relationship of average load factor R≤low load factor determination value RL holds.

Steps S123 and S122 assign a new decision cycle Hn by multiplying the decision cycle Hn by a reduction factor α1 or α2 (however, α2<α1<1) to shorten the decision cycle.

Steps S117, S124 and S126 maintain the current decision cycle Hn.

Steps S125 and S121 assign a new decision cycle Hn by multiplying the decision cycle Hn by an increasing factor β1 or β2 (however, 1<β1<β2) to extend the decision cycle.

Step S127 determines whether the judgment cycle Hn is less than or equal to the lower limit judgment cycle HLL, replacing the previous step S109 in FIG. 2.

Step S128 substitutes the lower limit judgment cycle HLL for the judgment cycle Hn if step S127 is satisfied.

Step S129 determines if the judgment cycle Hn is greater than or equal to the upper limit judgment cycle HHH.

Step S130 assigns the upper limit judgment cycle HHH to judgment cycle Hn when step S129 is satisfied.

Figure 10:
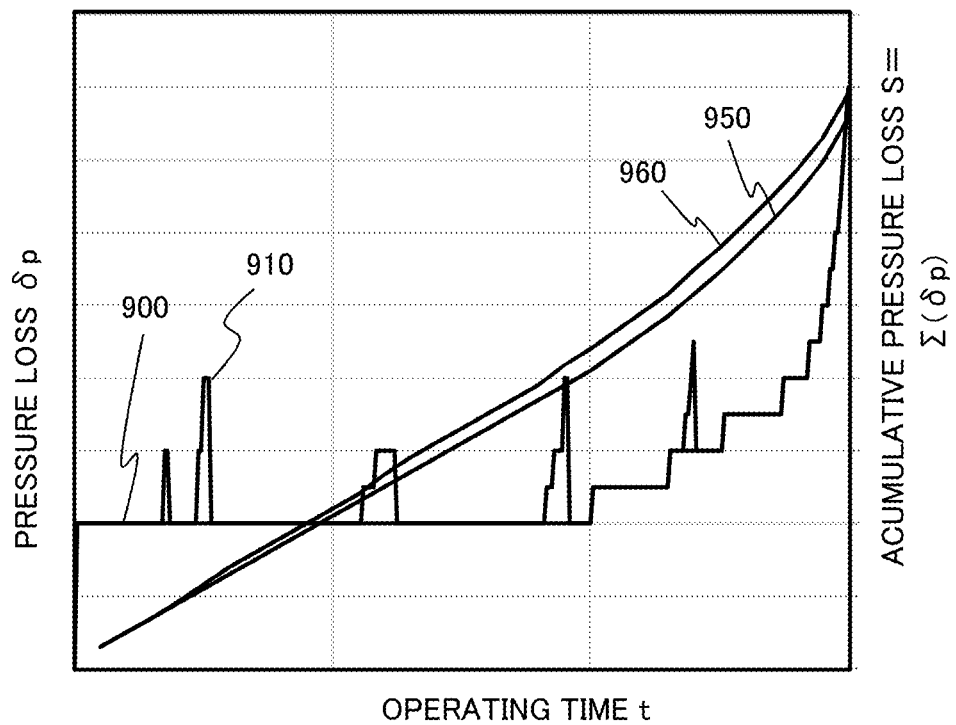
FIG. 10 shows the pressure drop curve and cumulative pressure drop curve in Example 7.

FIG. 10 shows the pressure loss curve and the accumulated pressure loss curve for this example, where the horizontal axis is the operating time, the left-hand vertical axis is the pressure loss δp, and the right-hand vertical axis is the accumulated pressure loss S. In FIG. 10, for example, if there is no prefilter, only an intake filter, and the compressor load factor is always constant, the pressure loss curve 900 is a staircase-shaped graph (due to digital values). The pressure loss δp begins to increase from about 80% of the operating time when the intake filter clogging alarm is triggered (right end of the graph), and then the pressure loss increases rapidly for a short period of time, which triggers the intake filter clogging alarm. On the other hand, pressure loss curve 910 for the case with a pre-filter shows that pressure loss δp rises for a short time when the pre-filter becomes clogged, and then falls when the pre-filter is cleaned or replaced, indicating a peak pressure loss due to clogging and cleaning of the pre-filter. The peak of pressure loss due to clogging and cleaning of the prefilter can be seen. However, in addition to pre-filter and intake filter clogging, pressure loss δp varies with compressor load factor, and changes in compressor load factor increase or decrease faster and more rapidly than the progress of filter clogging, making it difficult to use the instantaneous value of pressure loss δp to determine pre-filter clogging. Therefore, it is difficult to use the instantaneous value of pressure loss δp to determine if the pre-filter is clogged. Therefore, a cumulative pressure loss curve, which is a function of operating time t, is calculated by accumulating the measured pressure loss δp.

In FIG. 10, the cumulative pressure loss curve 960 with a pre-filter is larger than the cumulative pressure loss curve 950 without a pre-filter because the pressure loss due to clogging of the pre-filter is added to the cumulative pressure loss. The cumulative pressure loss curve 960 with pre-filter is larger than the cumulative pressure loss curve 950 without pre-filter.

Figure 11:
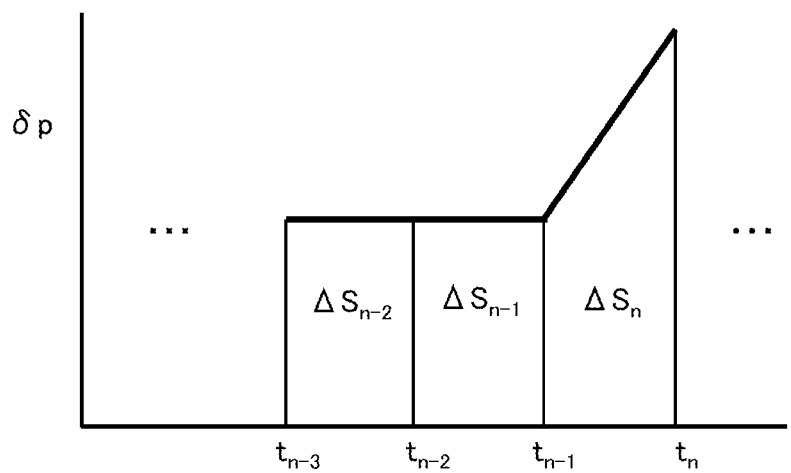
FIG. 11 shows the pressure drop versus operation time in Example 7.

FIG. 11 shows the pressure loss δp versus operation time t in this example. The cumulative pressure loss $Sn=\Sigma(\delta pn)$ from operation time 0 to operation time tn at the nth judgment. Here, the difference between the operating time tn−1 of the (n−1)th judgment and the operating time tn up to the nth judgment is the judgment cycle Hn, and the increment of the accumulated pressure loss Sn over the judgment cycle Hn is ΔSn. In FIG. 11, the cumulative pressure loss increment ΔSn from the (n−1)th judgment to the nth judgment is equal to the area bounded by the operating time tn, the operating time tn−1, and the pressure loss δp curve.

Figure 12:
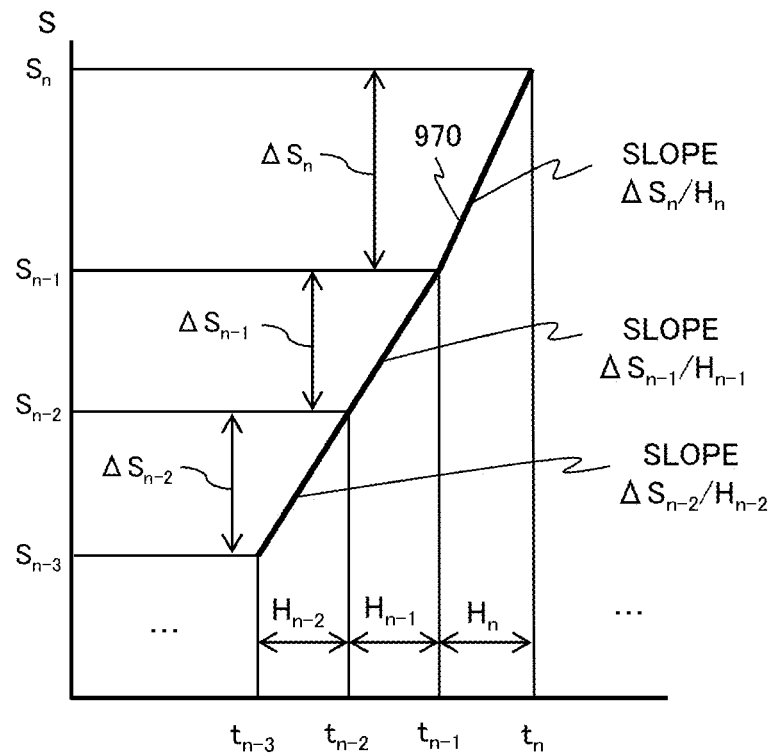
FIG. 12 shows the cumulative pressure drop versus operating time in Example 7.

FIG. 12 shows the cumulative pressure drop S versus operating time t in this example, with the operating time on the horizontal axis corresponding to FIG. 11. In FIG. 12, the cumulative pressure loss curve 970 is always increasing to the right, but the magnitude of the slope varies with the degree of pre-filter clogging and compressor load factor. Here, the incremental ΔSn (=Sn−(Sn−1)) of the accumulated pressure loss per judgment cycle Hn is expressed as the slope of the accumulated pressure loss ΔSn/Hn, and the slope of the accumulated pressure loss at one previous judgment, that is, at the (n−1)th judgment cycle Hn−1, is similarly expressed as (ΔSn−1/Hn−1). In FIG. 11, assuming that the length of the decision cycle Hn−2 (=(tn−2)−(tn−3)) and the length of the decision cycle Hn−1 (=(tn−1)−(tn−2)) are equal in length, the pressure drop δp during this period is constant. The cumulative pressure loss S curve in FIG. 12 has the same slope (ΔSn−2/Hn−2) and slope (ΔSn−1/Hn−1) are equal at the judgment cycles Hn−2 and Hn−1. On the other hand, at the decision cycle Hn−1 (=(tn−1)−(tn−2)) in FIG. 11 and at the decision cycle Hn (=(tn)−(tn−1)) time, the pressure drop δp is increasing. The slope ΔSn/Hn is greater than the aforementioned (ΔSn−2/Hn−2) and (ΔSn−1/Hn−1) because the incremental cumulative pressure drop ΔSn is greater than ΔSn−1 and ΔSn−2.

Figure 13:
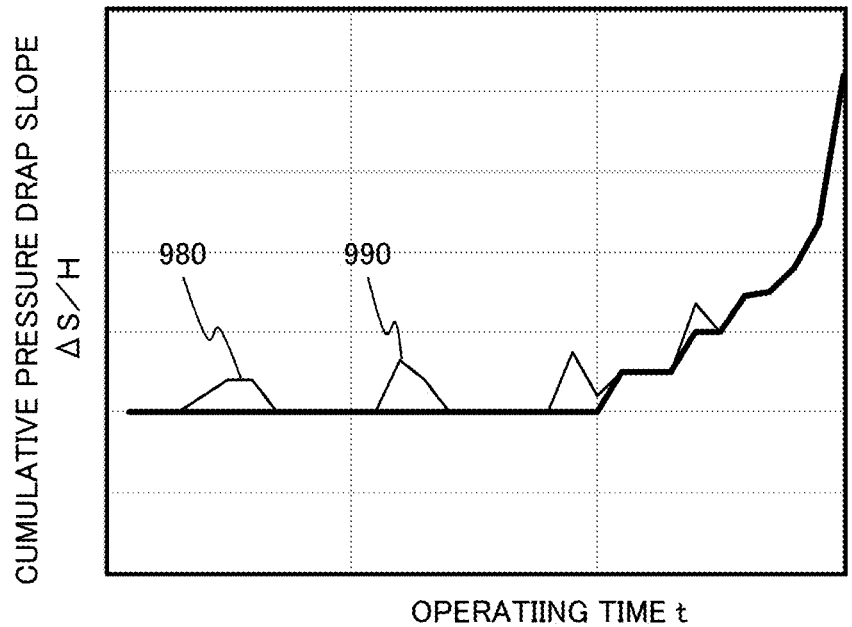
FIG. 13 shows the slope of the cumulative pressure drop curve versus operating time in Example 7.

FIG. 13 compares the slope ΔS/H980 of the cumulative pressure loss curve without prefilter and the slope ΔS'/H990 were created and compared in this figure. The slope ΔS/H980 of the cumulative pressure drop curve without pre-filter shows a rapid increase in the operating time when the clogging of intake filter 601 progresses rapidly from the middle of the operating time. On the other hand, the slope ΔS'/H990 of the cumulative pressure loss curve with a pre-filter also shows an increase or decrease in slope and a peak due to the occurrence of pre-filter clogging and unclogging by cleaning. Calculating the slope of the accumulated pressure loss in this manner facilitates determination of the pre-filter clogging condition.

Furthermore, as shown in FIG. 9, when combined with the average load factor R of the compressor, for example, a large load factor can be used to separate the increase in cumulative pressure loss due to a large volume of air passing through the filter from the increase in cumulative pressure loss due to progressive clogging of the prefilter. This allows the decision cycle H for pre-filter cleaning to be changed according to the degree of filter clogging.

For example, in FIG. 9, if (ΔSn−1/Hn−1)<(ΔSn/Hn) is established in step S113, go to step S114. This means that the pressure loss is greater than at the time of the previous determination. If R≤RM is not satisfied in step S114, the high load rate is determined, and the system proceeds to step S117, where the current judgment cycle H is maintained because the situation is estimated to be high load rate and large pressure loss. On the other hand, if R≤RM is established in step S114, go to step S116, where if R≤RL is established, the low load factor is determined and go to step S122. At this time, since the pressure loss is large despite the low load factor, it is judged that clogging of the pre-filter has progressed to a considerable degree, and the current judgment cycle Hn is multiplied by a reduction factor α2 to update to a shorter judgment cycle Hn×α2. On the other hand, if R≤RL is not satisfied in step S116, i.e., the medium load factor is judged to be in the range of RL<R≤RM, the current judgment cycle Hn is multiplied by the reduction factor α1 in the next step S123, and the cycle is updated to a shorter judgment cycle Hn×α1. Here, the reduction factor is the relationship α2<α1<1, the smaller load factor and larger pressure drop conditions result in a shorter decision cycle H.

On the other hand, if (ΔSn−1/Hn)<(ΔSn/Hn) is not established in step S113, go to step S115. In step S115, it is further determined (ΔSn/Hn)<(ΔSn−1/Hn−1) is whether established, and if so, go to step S118. If not, that is, (ΔSn/Hn)=(ΔSn−1/Hn−1), meaning that there is no change in pressure loss in the previous and current judgment cycles, go to step S119. If R≤RM is established in the above step S118, go to the next step S120. If R≤RL is established in step S120, it is judged as low load rate and go to step S124. In this case, the pressure loss is judged to be small at the low load rate, and the current judgment cycle Hn is maintained. On the other hand, if R≤RM is not satisfied in step S118, then the high load rate is judged, and the cycle Hn is updated to a longer cycle Hn×β2, where the current cycle Hn is multiplied by an increase factor β2, because the pressure loss is estimated to be small at a high load rate and the progress of pre-filter clogging is judged to be slow. If R≤RL is not satisfied in step S120, i.e., the medium load factor is judged to be in the range of RL<R≤RM, the current judgment cycle Hn is multiplied by an increase factor β1 in the next step S125 to update to a longer judgment cycle Hn×β1. Here, the increase coefficient is $1<\beta 1<\beta 2$, and a higher load factor with a smaller pressure loss results in a longer judgment cycle Hn.

If the above step S115 fails, go to step S119. In step S119, the initial cumulative pressure loss slope $\Delta S1/H1$, which is obtained from the increase in cumulative pressure loss $\Delta S1$ during the judgment cycle H1 time between the first pre-filter judgment after the compressor starts operation and the second pre-filter judgment, is compared with the cumulative pressure loss slope $\Delta Sn/Hn$ at this judgment. If $(\Delta S1/H1)<(\Delta Sn<Hn)$ holds, go to step S126 and assign the current decision cycle Hn to Hn to maintain the length of the decision cycle. If not, the flow merges to the load factor determination flow in step S118. The effect of step S119 is that even if the slope of the pressure loss in the previous and current judgment cycle is the same and has not changed, if the pre-filter clogging has progressed and the slope is large in absolute value, it is preferable not to extend the judgment cycle Hn. Therefore, one of the evaluation criteria for the slope of the cumulative pressure loss is to compare the initial cumulative pressure loss slope $\Delta S1/H1$ with the cumulative pressure loss slope $\Delta Sn/Hn$ at the time of this judgment. This is to maintain the length of the judgment cycle when $(\Delta S1/H1)<(\Delta Sn<Hn)$. The initial cumulative pressure drop slope $\Delta S1/H1$ assumes that the degree of clogging of intake filter 601 is small. In this case, it is expected that the slope of the cumulative pressure drop due to clogging of the prefilter is likely to be affected. Using the slope $\Delta S1/H1$ of the cumulative pressure loss at this time as the evaluation criterion improves the validity of the slope $\Delta Sn/Hn$ of the cumulative pressure loss at the time of this judgment at this time.

The judgment cycle Hn varies depending on the slope of the accumulated pressure drop and the average load factor. The upper and lower limit judgment cycles HHH and HLL are predetermined so that the judgment cycle H updated in steps S121, S122, S123, and S125 does not keep getting shorter by the decrease factor $\alpha$ or longer by the increase factor $\beta$ depending on conditions. The upper and lower limit judgment cycles HHH and HLL are predetermined so that the judgment cycle H does not change beyond the upper and lower limits. After passing through the above steps S122 and S123, go to step S127, and if Hn≤HLL is satisfied, substitute HLL for the judgment cycle Hn and go to step S110. Similarly, after passing the above steps S121 and S125, go to step S129, and if HH≤Hn is established, substitute HHH for the judgment cycle Hn, and go to step S110. If steps S117, S124, and S126 above are passed, go to step S110 above because the judgment cycle Hn is maintained as it was at the previous judgment.

As described above, according to this example, the combination of the slope $\Delta S$ of the cumulative pressure loss curve and the average load factor R makes it easy to determine the clogging state of the pre-filter. Also, as in Example 1, the frequency of cleaning or replacement of the pre-filter for compressed air and the pre-filter for cooling air can be optimized according to the type of gas compressor and load factor.

Example 8

In this example, an example like Example 2 is described for Example 7, where instructions for cleaning or replacing the pre-filter are given in consideration of changes in the input current of the cooling fan.

Figure 14:
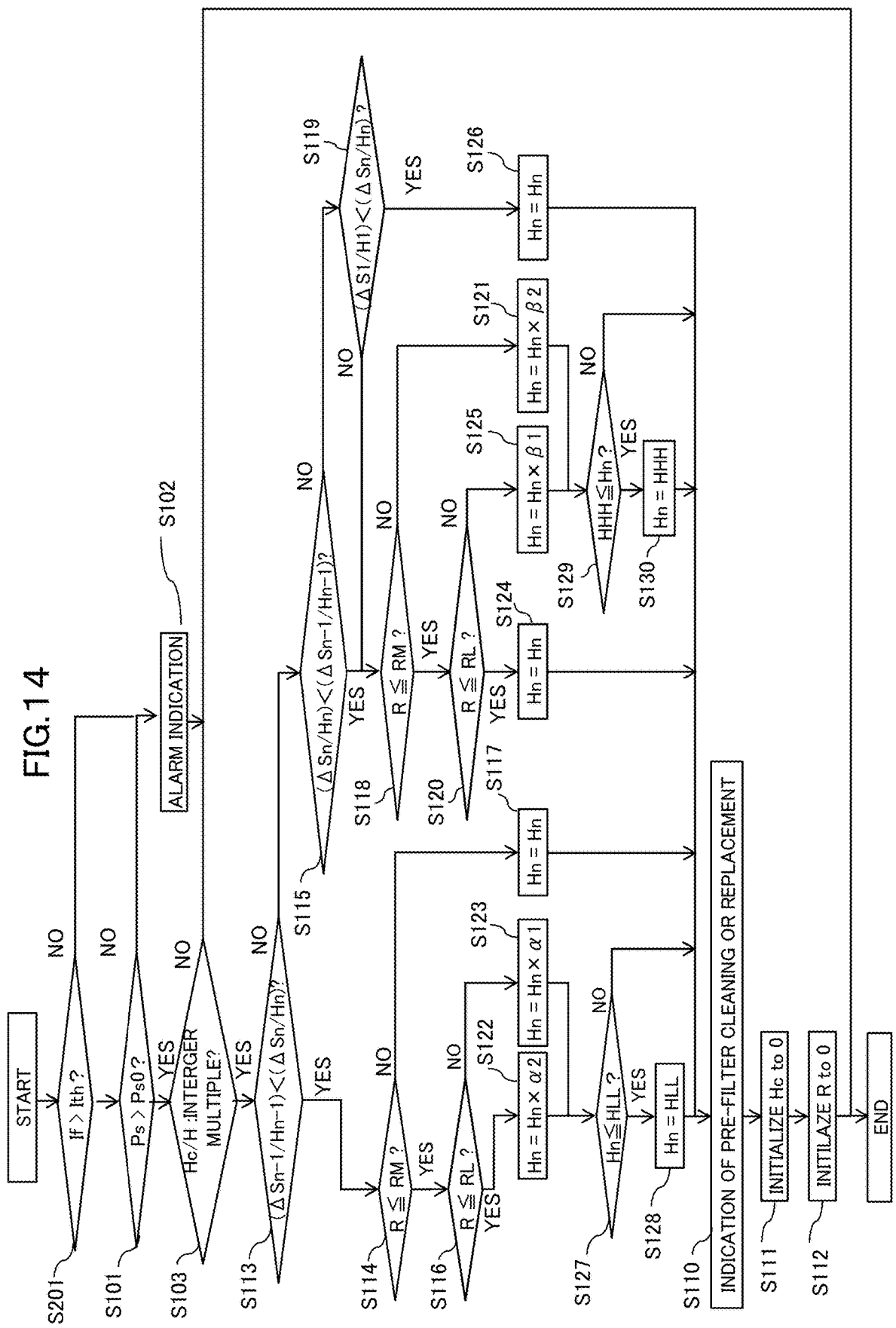
FIG. 14 shows a process flowchart for determining when to clean or replace the prefilter in Example 8.

FIG. 14 is a flowchart for determining when to clean or replace the pre-filter in this example. This processing flowchart is executed by controller 702. The difference from FIG. 9 in FIG. 14 is the addition of step S201. In FIG. 14, as explained in FIG. 3, a predetermined threshold value "Ith" is set for the input current "If" of cooling fan 204 in step S201. If the cooling fan input current "If" is smaller than the predetermined threshold value "Ith", it is judged that the clogging of the pre-filter for cooling air has progressed to a considerable degree, and the system proceeds to step S102 to display an alarm.

As described above, in addition to the effect of Example 7, this example has the effect of being able to determine in advance whether the pre-filter for cooling air is clogged.

Example 9

This example describes an example that can determine in advance the clogging of pre-filter for cooling air 600b when the cooling fan is driven by an inverter and the speed is controlled at variable speed, like Example 4, in contrast to Example 8.

Figure 15:
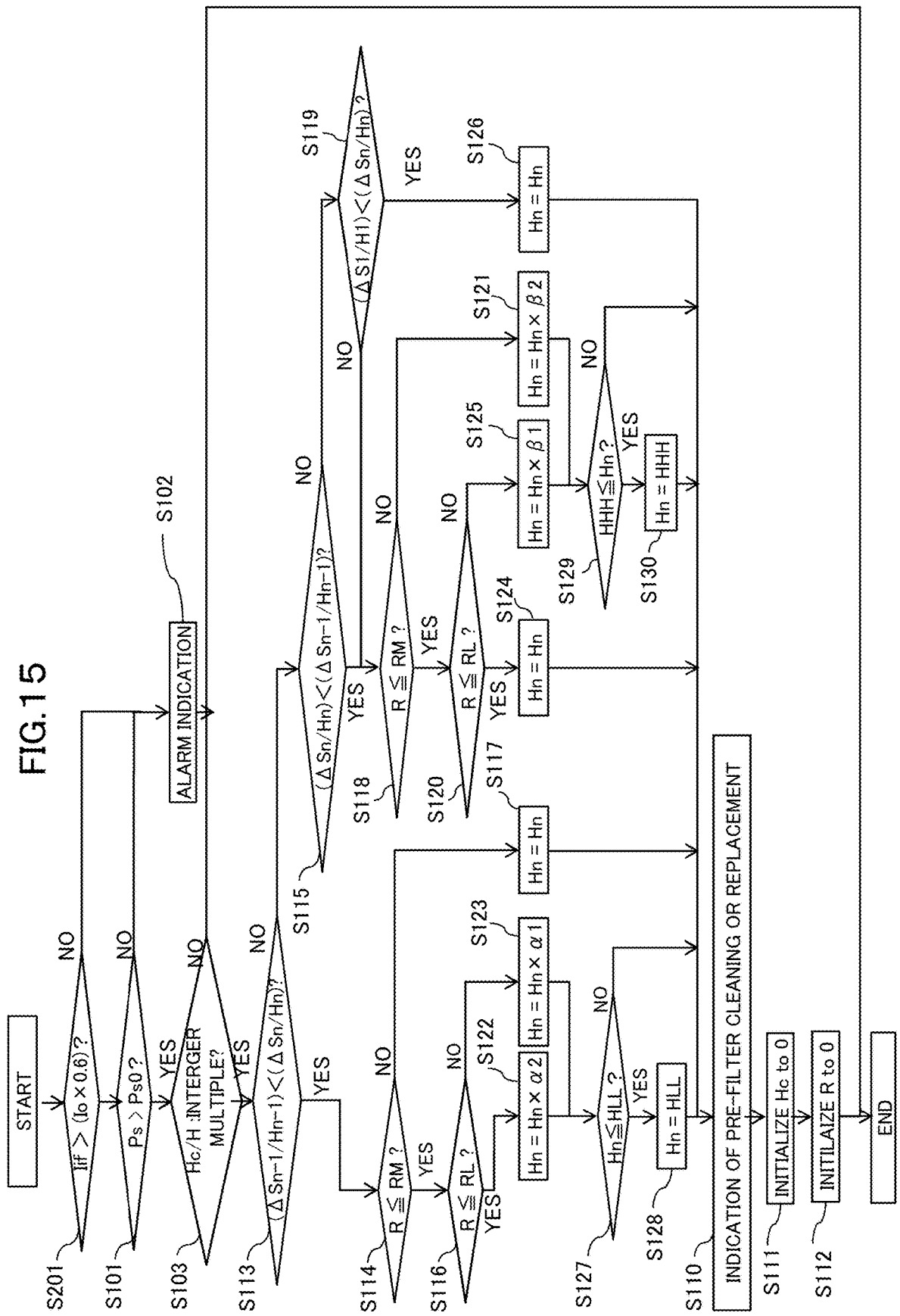
FIG. 15 shows a process flowchart for determining when to clean or replace the prefilter in Example 9.

FIG. 15 shows the processing flowchart for determining when to clean or replace the pre-filter in this example. This processing flowchart is executed by controller 702. The difference from FIG. 14 in FIG. 15 is that step S201 is replaced by step S301.

In FIG. 15, if the measured inverter input current "Iif" for the cooling fan is less than 60% of the predicted inverter input current "Io" at a given output frequency, as explained in FIG. 6, the pre-filter for the cooling air is clogged and the system proceeds to step S102 for displaying the alarm.

As described above, this example has the same effect as Example 8 in that the clogging of the pre-filter for cooling air can be determined in advance.

Although the above examples have been described, the present invention is not limited to the above examples but includes various variations. For example, the gas compressor described in the above examples is an oil-free two-stage screw air compressor, but it is not limited to this type of fluid machine. It can also be applied to oil-filled compressors in which lubricating oil is injected into the compression chamber inside the compressor body for the purpose of cooling and sealing compressed air and lubricating the sliding surfaces of a pair of screw rotors, which are not shown in the figure.

Although the gas compressors in Examples 1 through 9 above are air-cooled, even water-cooled compressors have an air intake 2a for compressed air, and in many cases, a small cooling fan is provided for ventilation inside the chassis, or a self-cooling fan is provided on the anti-load side of the motor 103. In addition, the above example can be applied to water-cooled compressors as well, since many of them are equipped with a cooling air intake 3a, regardless of size, if they are equipped with a small cooling fan for ventilation inside the chassis or a self-cooling fan on the anti-load side of the motor 103.

Similarly, the compression method is not limited to the twin-screw type with a pair of male and female screw rotors in the above example, but can also be applied to single-screw type compressors consisting of a single screw rotor and multiple gate rotors, any positive displacement compressor such as twin-screw type and reciprocating type, and centrifugal and axial flow type turbo The system can also be applied to centrifugal and axial-flow turbo compressors.

The above examples are described in detail for the purpose of explaining the invention in an easy-to-understand manner and are not necessarily limited to those having all the described configurations. It is also possible to replace a part of the configuration of one example with the configuration of another example, and it is also possible to add the configuration of another example to the configuration of one example. It is also possible to add, delete, or replace some of the configurations of each example with other configurations.

DESCRIPTION OF SIGNS

1: GAS COMPRESSOR, 2a: AIR INTAKE, 2b: INTAKE DUCK, 3a: COOLING AIR INTAKE, 3b: COOLING AIR DUCT, 101: COMPRESSOR BODY, 102: COMPRESSOR BODY, 103: MOTOR, 201: INTERCOOLER, 202: AFTERCOOLER, 204: COOLING FAN, 600a: PRE-FILTER FOR COMPRESSED AIR, 600b: PRE-FILTER FOR COOLING AIR, 601: COMPRESSED AIR INTAKE, 701: INPUT DEVICE, 702: MEMORY UNIT, 703: CONTROLLER, 703a: INVERTER FOR COOLING FAN, 703b: INVETER FOR MOTOR, 900, 910: PRESSURE LOSS CURVE, 950, 960, 970, 980, 990: CUMULATIVE PRESSURE LOSS CURVE, Ps: SUCTION PRESSURE, Ps0: PRESET SUCTION PRESSURE WARNING VALUE, R: AVERAGE LOAD FACTOR of GAS COMPRESSOR, Rc: CURRENT LOAD FACTOR of GAS COMPRESSOR, Pf: COOLING FAN AVERAGE LOAD FACTOR, Rfc: CURRENT LOAD FACTOR of COOLING FAN, RH: HIGH LOAD FACTOR JUDGMENT VALUE, RM: MEDIUM LOAD FACTOR JUDGEMENT VALUE, RL: LOW LOAD FACTOR JUDGEMENT VALUE, HH: HIGH FREQUENCY CLEANING CYCLE, HM: NORMAL CLEANING CYCLE, HL: LOW FREQUENCY CLEANING CYCLE, Hc: CUMULATIVE OPERATING HOURS FROM LAST CLEANING UNSZTRUCTION TO PRESENT, H: JUDGMENT CYCLE

What is claimed is:

1. A gas compressor-having, comprising:
a first pre-filter for compressed air installed at a compressed air intake of an enclosure of the gas compressor for primary removal of dust;
an intake filter for further secondary removal of dust;
at least one compressor body which sucks in and compresses air through the intake filter and an intake passage;
a motor driving the compressor body;
an air cooler for cooling compressed air;
a cooling fan passing cooling air to the air cooler;
a cooling air intake through which outside air is drawn in by the cooling fan, fan;
a second pre-filter in the cooling air intake; and
a controller for controlling the gas compressor,
wherein the controller determines the frequency of cleaning or replacement of the first pre-filter and the second pre-filter based on load factor as an indicator of the operating condition of the gas compressor,
wherein the compressor body is a variable speed machine,
wherein the gas compressor further comprises a variable speed controller which allows the compressor body to be controlled at variable speeds, and
wherein the controller calculates the average load factor R as said load factor, compares the average load factor R with the load factor determination value, and determine the frequency of cleaning or replacement of the first pre-filter for compressed air and the second pre-filter for cooling air,
wherein the current load factor $Rc=(T2 \cdot fc)/(T3 \cdot fr)$, average load factor $R = \Sigma RC/N$,
T3 is an operation cycle time for one load operation and one no-load operation of the compressor body,
T1 is the no-load operation time,
T2 is the load operation time, $$T3 = T1 + T2.$$

fc is the current frequency of the variable speed controller,
fr is the rated frequency of the variable speed controller, and
N the number of operation cycles.

* * * * *